United States Patent Office 2,714,115
Patented July 26, 1955

2,714,115

ETHANOL-MISCIBLE METHYL PHENYLBUTOXY-POLYSILOXANE

Norman G. Holdstock, Schenectady, N. Y., assignor to General Electric Company, a corporation of New York No Drawing. Application July 2, 1954,
Serial No. 441,159

3 Claims. (Cl. 260—448.8)

This invention is concerned with the preparation of ethanol-miscible organopolysiloxanes suitable in the pharmaceutical and cosmetic arts. More particularly, the invention relates to an ethanol-soluble organopolysiloxane containing silicon-bonded tertiary butoxy groups obtained by effecting hydrolysis of a mixture of ingredients consisting essentially of stipulated proportions of dimethyldichlorosilane, trimethylchlorosilane and phenyltrichlorosilane employing water and tertiary butyl alcohol as the sole hydrolyzing medium.

In the preparation of various cosmetic and pharmaceutical products, including lotions, salves, etc., organopolysiloxanes have been found to have a beneficial effect in such applications, for instance, in suntan lotions, in the treatment of certain fungicidal infections, such as athlete's foot, etc. Because of this, attempts have been made to obtain fluid, non-resinous organopolysiloxanes which are soluble in ethanol, an alcohol most advantageously employed in the aforesaid pharmaceutical and cosmetic applications. However, heretofore, ethanol-miscible organopolysiloxanes have been limited to low molecular weight linear methylpolysiloxanes of the formula

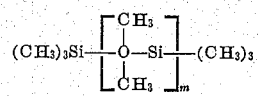

where $m$ is an integer equal to from 1 to 4, and low molecular weight cyclic methylpolysiloxanes of the formula

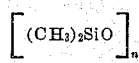

where $n$ is an integer equal to from 3 to 5. Unfortunately, these low molecular weight methylpolysiloxanes were too volatile to be useful in the desired applications and, accordingly, were not suitable for the purpose.

Unexpectedly, I have discovered that I am able to obtain ethanol-miscible (in all proportions) organopolysiloxanes of sufficiently low volatility, which are useful in many cosmetic and pharmaceutical applications, and that such ethanol-soluble materials are sufficiently inert and adaptable for a large number of applications extremely useful for the above-designated purposes. In accordance with my invention, I have found that I can hydrolyze a mixture of methylchlorosilanes and a phenylchlorosilane in a critical range of proportions employing a special hydrolyzing medium to obtain a product which is completely ethanol-soluble or miscible. The fluid thus obtained is of low molecular weight (of the order of about 600 to 800), has a desirably low volatility and can be obtained in readily reproducible compositions by distilling the formed methylphenylbutoxypolysiloxane at elevated temperatures without affecting undesirably the ethanol miscibility of the useful, less volatile portion of the fluid.

The hydrolyzable organosilanes employed in making this ethanol-miscible composition are critical and the proportions of these hydrolyzable silanes, as well as the hydrolysis medium used for the purpose, are also critical.

In general, the hydrolyzable organosilanes comprise the following ingredients in the stipulated percentages, by weight:

TABLE

| Ingredient: | Per cent by weight |
|---|---|
| Dimethyldichlorosilane | 25–30 |
| Trimethylchlorosilane | 22–26 |
| Phenyltrichlorosilane | 45–50 |

The alcohol used for hydrolysis purposes in order to obtain the above-described product consists of tertiary butyl alcohol which, for optimum results, is present, by weight, in an amount equal to from 90 to 110 parts of the alcohol per 100 parts of the mixture of the above-described organochlorosilanes. Deviations from this proportion, or omitting the tertiary butyl alcohol in the hydrolysis with the water, will give entirely different results. Thus, it has been surprisingly found that hydrolysis of the above blend of chlorosilanes using only water and omitting the tertiary butyl alcohol unexpectedly produces an ethanol-immiscible hydrolyzate. The criticality in using tertiary butyl alcohol is emphasized by the fact that attempts to use other alcohols, such as methyl, ethyl and isopropyl alcohols, or tertiary amyl alcohol, even with water, produced a product which, although initially ethanol-miscible immediately after hydrolysis, was unstable in this respect, since as the product was further processed, for instance, by filtration or by devolatilization to remove the low boiling volatile products, condensation of the polymer occurred almost immediately and resulted in a material of poor or no miscibility with ethanol.

The amount of water used for hydrolysis purposes should also be controlled within certain narrow ranges and on a weight basis has been found to be advantageously of the order of about 200 to 400 parts water per 100 parts of the mixture of hydrolyzable methyl and phenyl chlorosilane blend.

The method of preparing the ethanol-miscible methyl phenylbutoxypolysiloxane is preferably as follows: The mixture of chlorosilanes is added slowly with agitation to the mixture of the tertiary butyl alcohol and water, maintaining the temperature below 80° C., preferably around 50 to 65° C. If higher hydrolysis temperatures are used, the product will tend toward less satisfactory ethanol solubility. The addition of the chlorosilane blend to the hydrolysis medium usually takes about 20 to 45 minutes, and after the addition is complete, agitation of the reaction product is continued to insure intimate dispersion of all the ingredients. Thereafter, the upper acid-free layer is removed, the residual methyl phenylbutoxypolysiloxane is neutralized, for example, with sodium carbonate, in an amount sufficient to raise the pH to at least 6. At this point it is usually desirable to filter the methyl tertiarybutoxyphenylpolysiloxane fluid and to dry it to remove any residual traces of water.

The product is then subjected to distillation, preferably under reduced pressure, to remove any unreacted tertiary butyl alcohol or water, employing temperatures of about 100° to 130° C. at about 10 to 20 mm. pressure of mercury. This distillation under reduced pressure will also remove undesirable low molecular weight volatile products (mostly products of about 200–300 molecular weight which constitute about 6–8% of the total weight of the polysiloxane reaction product), and leave behind a more homogeneous and less volatile ethanol-miscible methyl phenylpolysiloxane containing a plurality of silicon-bonded tertiary butoxy groups. The methyl phenylpolysiloxane, for optimum properties, contains on a weight basis from 0.5 to 5% silicon-bonded tertiary butoxy groups, based on the weight of the polysiloxane. This range of tertiary butoxy groups can be obtained by employing the tertiary butyl alcohol within the limits described above. Additional treatment, for instance, with fuller's earth or with carbon black, may be desired to remove undesirable color or odors which may have accumulated as a result of the processing of the ethanol-miscible organopolysiloxane.

In order that those skilled in the art may better understand how the present invention may be practiced, the following example is given by way of illustration and not by way of limitation: All parts are by weight.

*Example*

A mixture consisting of 28.8 parts dimethyldichlorosilane, 24.2 parts trimethylchlorosilane and 47.1 parts phenyltrichlorosilane was added slowly with agitation to a mixture of 100 parts tertiary butyl alcohol and 300 parts water over a period of about 25 to 30 minutes, cooling the reaction mixture so that the temperature thereof was below 80° C. throughout the hydrolysis. After all the silanes had been added, the mixture was stirred an additional 10 minutes and the aqueous acid layer removed. The residual organopolysiloxane layer was neutralized with an amount of sodium carbonate sufficient to give a pH of around 6 and thereafter the product was filtered and dried to remove residual traces of water. The low molecular weight products present in the methyl phenylbutoxypolysiloxane were removed by distillation at a temperature of about 100 to 130° C. at reduced pressure of around 15 mm. mercury. The product thus obtained had a viscosity of about 40 centistokes, a molecular weight of about 700, was miscible with ethanol and even methanol in all proportions, and could be readily employed in the preparation of cosmetic and pharmaceutical lotions, salves, etc. This material exhibited unusual compatibility with other materials, such as mineral oil, castor oil, and other chemical compositions with which in the past the usual methyl or methyl phenylorganopolysiloxane fluids (or oils) have shown little or no compatibility. Of additional importance is the discovery that the above-described methyl phenyltertiarybutoxypolysiloxane in the form of a 5 percent weight solution in ethanol can hold up to 14 percent water in solution without any phase separation. This property is of particular interest since it is a means for incorporating an organopolysiloxane into a water-containing system without the need for emulsification and still maintaining the integrity of the mixture of ingredients as far as phase separation is concerned.

In addition to employing the above-described methyl phenyltertiarybutoxypolysiloxanes in cosmetic and pharmaceutical applications, they can also be used in various lotions and polishes using organopolysiloxanes in the formulation. The fact that water can be added to formulations containing these methyl phenylbutoxypolysiloxanes permits reducing the amount, if any, required of emulsifying or dispersing agents usually employed in liquid organopolysiloxane polishes. This reduction or elimination in the use of such surface-active agents should give improved and more lasting lotions and polishes.

What I claim as new and desire to secure by Letters Patent of the United States is:

1. A methyl phenyltertiarybutoxypolysiloxane obtained by hydrolyzing at a temperature below 80° C. a mixture of chlorosilanes consisting, by weight, of from 25 to 30 parts dimethyldichlorosilane, from 22 to 26 parts trimethylchlorosilane and from 45 to 50 parts phenyltrichlorosilane, employing as the hydrolyzing medium a mixture of ingredients consisting, by weight, of from 90 to 110 parts tertiary butyl alcohol and from 200 to 400 parts water per 100 parts of the mixture of the aforesaid organochlorosilanes.

2. A composition of matter comprising (1) ethanol and (2) an ethanol-miscible methyl phenyltertiarybutoxypolysiloxane obtained by hydrolyzing at a temperature below 80° C. a mixture of chlorosilanes consisting, by weight, of 25 to 30 parts dimethyldichlorosilane from 22 to 26 parts trimethylchlorosilane and from 45 to 50 parts phenyltrichlorosilane, employing as the hydrolyzing medium a mixture of ingredients consisting, by weight, of from 90 to 110 parts tertiary butyl alcohol and from 200 to 400 parts water per 100 parts of the mixture of the aforesaid organochlorosilanes, the said methyl phenyltertiarybutoxypolysiloxane containing, by weight thereof, from 0.5 to 5% silicon-bonded tertiary butoxy groups.

3. The process for making an ethanol-miscible organopolysiloxane which comprises (1) hydrolyzing at a temperature below 80° C. a mixture of ingredients consisting, by weight, of from 25 to 30 parts dimethyldichlorosilane, from 22 to 26 parts trimethylchlorosilane, and from 45 to 50 parts phenyltrichlorosilane, employing as the hydrolyzing medium a mixture of ingredients consisting, by weight, of from 90 to 110 parts tertiary butyl alcohol and from 200 to 400 parts water per 100 parts of the mixture of the aforesaid organochlorosilanes, (2) isolating the water-insoluble methyl phenyltertiarybutoxypolysiloxane, and (3) thereafter treating the latter to obtain a product consisting substantially of methyl phenyl tertiary butoxy polysiloxanes having a molecular weight of from 600 to 800 and containing, by weight thereof, from 0.5 to 5% silicon-bonded tertiary butoxy groups.

References Cited in the file of this patent

UNITED STATES PATENTS

| | | |
|---|---|---|
| 2,398,672 | Sauer | Apr. 16, 1946 |
| 2,584,343 | Goodwin | Feb. 5, 1952 |

OTHER REFERENCES

Dow Corning Silicone Notes, No. 3–304, "Dow Corning 555 Fluid" (October 1954).